United States Patent [19]

Thompson

[11] 4,407,779

[45] Oct. 4, 1983

[54] DISPERSION CONTROL DEVICE

[75] Inventor: Joseph Thompson, Upper Saddle River, N.J.

[73] Assignee: Sterling Drug Inc., New York, N.Y.

[21] Appl. No.: 339,055

[22] Filed: Jan. 13, 1982

Related U.S. Application Data

[63] Continuation of Ser. No. 168,143, Jul. 14, 1980, abandoned.

[51] Int. Cl.[3] .............................................. B01D 11/02

[52] U.S. Cl. ......................................... 422/266; 4/227; 4/228; 222/540; 422/274

[58] Field of Search .......... 422/28, 255, 266, 274–276; 4/227, 228; 222/54, 540; 239/57, 60; 210/205, 473, 474, 477

[56] References Cited

U.S. PATENT DOCUMENTS

| | | | |
|---|---|---|---|
| 528,688 | 11/1894 | Payne | 210/473 X |
| 2,880,077 | 3/1959 | Floria | 422/266 |
| 2,967,310 | 1/1961 | O'Hare | 4/227 |
| 3,769,640 | 11/1973 | Castronovo | 4/228 |
| 3,781,926 | 1/1974 | Levey | 4/228 |
| 3,867,101 | 2/1975 | Herring | 4/228 X |
| 3,895,739 | 7/1975 | Buchtel | 4/227 X |
| 3,949,900 | 4/1976 | Chapel | 222/54 |
| 4,000,839 | 1/1977 | Tecco et al. | 222/540 |
| 4,066,187 | 1/1978 | Nieman et al. | 4/228 X |
| 4,244,062 | 1/1981 | Corsette | 4/228 |

FOREIGN PATENT DOCUMENTS

| | | | |
|---|---|---|---|
| 5946069 | 2/1971 | Australia . | |
| 3708071 | 6/1973 | Australia . | |
| 674090 | 12/1965 | Belgium . | |
| 72266 | 12/1893 | Fed. Rep. of Germany . | |
| 825830 | 12/1951 | Fed. Rep. of Germany | 210/473 |
| 1367309 | 9/1974 | United Kingdom . | |

*Primary Examiner*—Richard L. Chiesa

*Attorney, Agent, or Firm*—Wenderoth, Lind & Ponack

[57] ABSTRACT

A dispersion control device for use in a toilet tank for dispensing a soluble solid, in solution, in a controlled manner into the tank. The device includes a cap having a conical portion which extends inwardly and downwardly into the interior of the cap. The cap is attached to a container which contains the soluble solid, and the cap has a plurality of slots in the walls of the conical portion and a hole at the lowermost portion of the conical portion. In operation, the conical portion of the cap defines an intermediate holding chamber which holds and allows dispersion of a specified concentration and predetermined amount of solution into the tank, as a result of the flows that occur during flushing.

20 Claims, 7 Drawing Figures

DISPERSION CONTROL DEVICE

This is a continuation of Ser. No. 168,143 filed July 14, 1980, now abandoned.

BACKGROUND OF THE INVENTION

1. Field of the Invention

This invention relates to devices for dissolving and dispensing a solid and for controlling the rate of flow of the solid in solution in a dispersed manner into a toilet tank or bowl.

2. Description of the Prior Art

Efforts to affect dispersion of a dissolved solid into a toilet bowl or tank have encompassed many different methods, techniques and devices. The problem with prior art dispensing/dispersing devices has been that they are either incapable of controlling the dispersion and rate of flow of the solid in solution into the tank or they are too complicated and expensive to manufacture and operate.

U.S. Pat. No. 3,781,926 to Levey discloses just such a device. Specifically, the Levey patent discloses a cap which is usable with the container filled with a water soluble compound. The cap includes an inner and outer shell having orifices at certain locations, and the shells are positioned with respect to each other so as to allow a specified quantity of dissolved solid to flow from the container for every flushing of the tank. The device of Levey however, is not shaped so as to take advantage of the various turbulent flows generated in a tank during flushing, and the dispersion of the solution into the tank is not as rapid, controlled and efficient as in the present invention. Further, the Levey device has a much more complicated construction than the present invention and is therefore much more expensive to manufacture.

U.S. Pat. No. 3,895,739 to Buchtel discloses a dispenser for a flush tank. The structure of Buchtel however, requires that a liquid be used in the container. Further, Buchtel shows an entire container assembly and cannot be used in combination with a compact size solid container as can be done with the device of the present invention.

Other devices, such as the one disclosed in U.S. Pat. No. 2,880,077 to Floria, although simple in structure, and used for dissolving and dispensing a solid in a liquid, cannot be used in a toilet flush tank or bowl since the structure disclosed is for use by being directly attached to a faucet.

Thus, the prior art devices have been either inadequate for providing effective dispersion of a solution which has been created within the devices or are too complicated in structure and thus very expensive to manufacture.

SUMMARY OF THE INVENTION

It is an object of this invention to provide a solution dispenser for a toilet which effectively dispenses and disperses specified quantities of a solution into a toilet tank.

Another object of this invention is to provide a solution dispenser which can be employed with a variety of soluble solid containing containers.

Still another object of the present invention is to provide a solution dispensing and dispersing device which is simple in construction and costs little to manufacture.

Accordingly, the device of the present invention includes a cap for a container which has a soluble chemical solid contained therein. Specifically, the cap has an inwardly extending conical portion which has a plurality of slots or openings in the conical portion for regulating the amount of solid, in solution that is dispensed and dispersed into the toilet. Further, the conical portion defines a middle or buffer zone which entraps the dosage to be dispersed therein until the toilet is flushed and the turbulance thus created disperses the solution into the tank.

With the above and other objects in view, the present invention will be described with reference to the accompanying drawings.

DETAILED DESCRIPTION OF THE INVENTION

Figure 1:
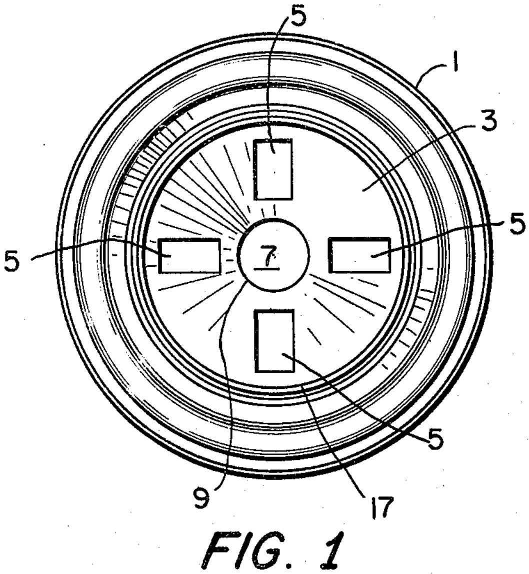
FIG. 1 is a top view of the cap of the present invention.

Referring now more particularly to the accompanying drawings, the numeral 1 designates generally a dispensing dispersion control cap embodying the present invention. The cap 1 includes a generally cylindrical outer wall portion and an inwardly and downwardly extending conical portion 3 which has a plurality of openings or slots 5 or 5' in the wall thereof. The cap 1 also includes a circular hole 7 at the lowermost portion 9 of the conical portion 3.

Figure 3:
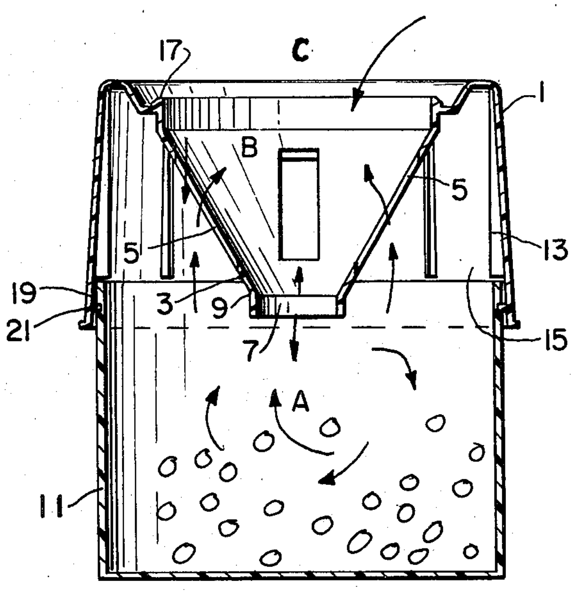
FIG. 3 is a side view in cross-section of the cap of the present invention mounted on a soluble solid containing container and showing the various fluid flows which occur when the device is in use.
Figure 2:
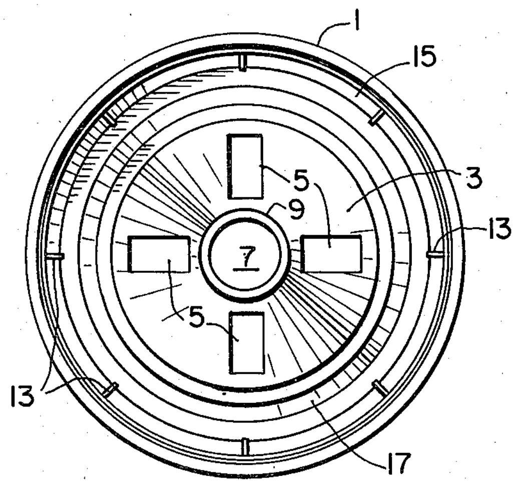
FIG. 2 is a bottom view of the cap of the present invention.
Figure 4:
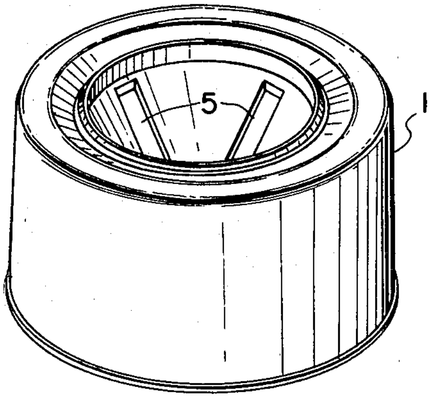
FIG. 4 is a perspective view of the cap of the present invention.

Preferably the entire cap is molded as a one piece unit from flexible plastic, and is therefore simple and inexpensive to make and virtually unbreakable. The employment of flexible plastic allows for the cap 1 to be fitted securely on a variety of soluble solid containing containers 11 (FIG. 3). Further, the fact that it is made of a flexible plastic allows for a tight seal to be maintained at the region where the cap 1 and the container 11 meet.

The cap 1 has an inwardly extending protuberance 21 which is received in a groove 19 on the top of the container 11 for securely fastening the cap 1 to the container 11.

Figure 6A:
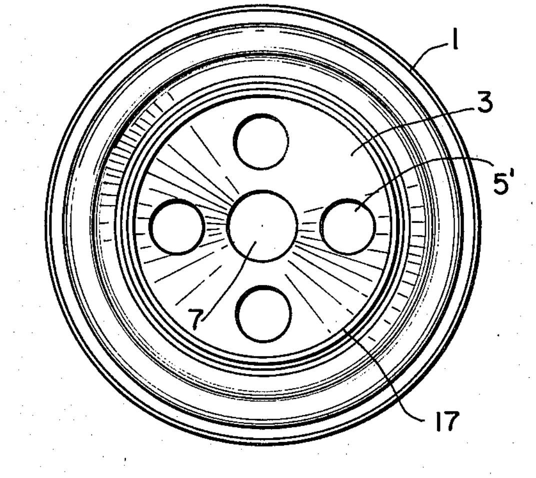
FIGS. 6A and 6B are a top view and perspective view, respectively, of an alternative embodiment of the cap of the present invention.
Figure 6B:
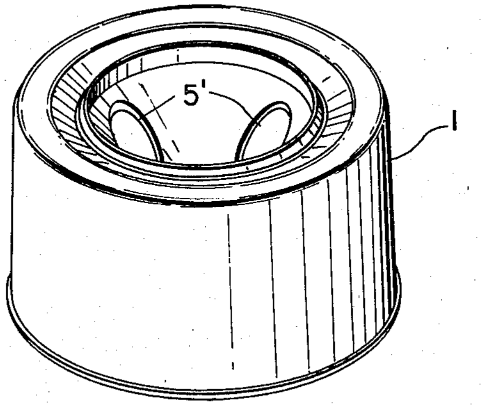

The conical portion 3 of the cap 1 has at the lowermost portion thereof hole 7 defined by a substantially vertically extending tube. The slots 5 are rectangular in shape and are longer in the lengthwise direction, or in the direction extending from the top of the cap 1 to the portion 9. In the alternative, slots 5' are shown as having an oval shape (FIGS. 6A, 6B). The oval slots 5' are used when mold manufacturing techniques are used to produce the device. In fact, the holes can be of any shape, size or number desired, and all of these factors are determined by the rate at which it is desired to dispense water soluble material from the container.

There are a plurality of rib-like projections 13 extending inwardly from the inner side wall 15 of the cap 1. These projections 13 serve to support the cap 1 in a stable manner on the container 11 as can be seen from FIG. 3. These serve to keep the cap from slipping too far over the container. Further, any conventional engaging means can also be used to perform this function and to hold the cap on the container.

Figure 5:
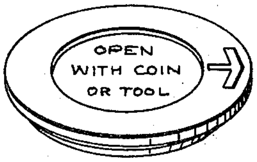
FIG. 5 is a perspective view of a childproof safety cap which can be used in combination with the dispersing cap of the present invention.

The cap 1 also includes an upwardly extending ridge 17 at the top of the conical portion 3 which serves to engage a childproof cap as shown in FIG. 5 and disclosed in U.S. Pat. No. 4,000,839.

Having described the various elements and features of the invention, the operation of the device is as follows.

When a container 11 having a soluble solid therein, such container being provided with a cap 1 which is constructed as described above, is disposed on the floor of a toilet tank, it will be appreciated that, when the water level of the tank is above the top portion of the cap 1, water will be admitted into the area A within the container 11 as shown in FIG. 3. Further, water will also be present in area B as shown in FIG. 3.

The arrows in FIG. 3 show the various flows occurring in the device of the present invention.

The water in area A serves to dissolve the soluble solid thereinto. While this is occurring, there results different concentrations of the solution and thus, a gravity induced flow or circulation will be created. More particularly, the lesser concentrated quantities of solution will flow out through the slots 5 or 5' which can be, but are not required to be equally laterally spaced from each other and, because of the conical design of the cap 1, will rest or be held in region B as defined by the conical portion 3. The solution which is resting within the conical portion 3 is of a desired concentration which is determined according to the size of the cap and slots used.

When the toilet is flushed, currents are created in the tank. As a result, the solution contained in the conical portion 3 is easily drawn off during the change in outside fluid level. Further, the turbulence also serves to mix the next dose which is then trapped, as described previously, in the conical portion 3.

The hole 7 at the lower part of the conical portion 3 serves to direct the water flow from region B into region A for mixing. After or during mixing, the newly prepared solution having the appropriate concentration then flows, in large part, although not totally, through slots 5 or 5', into conical portion 3 and readies itself for dispersion while preventing massive, or highly concentrated, doses from being dispensed during either chemical or mechanical activity.

I claim:

1. An apparatus for dissolving a solid material and for then dispensing the resultant solution, said apparatus comprising:

a container adapted to contain a solid to be dissolved and having a top opening;

a cap including an outer wall portion having a lower end and an upper end and a conical portion having an upper end and a lower end, said lower end of said outer wall portion being connected to said container with said outer wall portion extending upwardly from said top opening of said container, said upper end of said conical portion being connected to said upper end of said outer wall portion with said conical portion extending downwardly and inwardly from said upper end of said outer wall portion toward said top opening of said container, and said lower end of said conical portion being at a level no lower than said lower end of said outer wall portion;

said conical portion having a hole in said lower end thereof providing permanent communication to the interior of said container;

said conical portion having in the wall thereof a plurality of openings providing permanent communication to the interior of said container; and said hole and said openings forming means, when said container and cap are immersed in a liquid, for enabling access of the liquid through said cap into the interior of said container to dissolve a portion of the solid, and for enabling the thus formed solution of liquid and solid to be dispensed from said container through said cap and into the liquid.

2. An apparatus as claimed in claim 1, wherein said outer wall portion is imperforate, and said container is imperforate other than said top opening therein.

3. An apparatus as claimed in claim 1, wherein said wall of said conical portion, between said upper and lower ends thereof, has a uniform conical configuration.

4. An apparatus as claimed in claim 1, wherein said outer wall portion and said conical portion are formed integrally as a single element from flexible plastic material.

5. An apparatus as claimed in claim 1, further comprising an upwardly extending ridge integral with and extending around the entire top of said conical portion.

6. An apparatus as claimed in claim 1, wherein said openings comprise substantially rectangular slots extending generally downwardly and inwardly in said wall of said conical portion.

7. An apparatus as claimed in claim 1, further comprising means for connecting said cap to said container.

8. An apparatus as claimed in claim 7, wherein said connecting means comprises protruding engaging means located at the bottom of said outer wall portion, and engaging receiving means located at the top of said container, said protruding engaging means being held in said engaging receiving means for holding said cap on said container.

9. An apparatus as claimed in claim 1, further comprising laterally spaced ribs integral with the inside of said outer wall portion of said cap, said ribs terminating at positions spaced upwardly from the bottom edge of said outer wall portion for abutting the top of said container and supporting said cap on said container.

10. An apparatus as claimed in claim 1, wherein said openings comprise oval-shaped slots.

11. An apparatus as claimed in claim 1, wherein said openings are equally laterally spaced from each other around said wall of said conical portion.

12. A dispensing cap adapted to be connected to an open top of a container containing a solid to be dissolved and dispensed, said cap comprising;

an outer wall portion having a lower end adapted to be connected to an open top of a container containing a solid to be dispensed and an upper end adapted to be spaced above said lower end when said lower end is connected to the container open top;

a conical portion having an upper end and a lower end, said upper end of said conical portion being connected to said upper end of said outer wall portion with said conical portion extending downwardly and inwardly from said upper end of said outer wall portion, and said lower end of said conical portion being at a level no lower than said lower end of said outer wall portion;

said conical portion having a hole in said lower end thereof for providing permanent communication into the interior of the container when said cap is connected to the container;

said conical portion having in the wall thereof a plurality of openings providing permanent communication into the interior of the container when said cap is connected to the container; and said hole and said openings forming means, when said cap is connected to the container and when said cap and the thus connected container are immersed in a liquid, for enabling access of the liquid through said cap into the interior of the container to dissolve a portion of the solid, and for enabling the thus formed solution of liquid and solid to be dispensed from the container through said cap and into the liquid.

13. A cap as claimed in claim 12, wherein said wall of said conical portion, between said upper and lower ends thereof, has a uniform configuration.

14. A cap as claimed in claim 12, wherein said outer wall portion and said conical portion are formed integrally as a single element from flexible plastic material.

15. A cap as claimed in claim 12, further comprising an upwardly extending ridge integral with and extending around the entire top of said conical portion.

16. A cap as claimed in claim 12, wherein said openings comprise substantially rectangular slots extending generally downwardly and inwardly in said wall of said conical portion.

17. A cap as claimed in claim 12, further comprising connecting means protruding from the bottom of said outer wall portion for connecting said cap to the container.

18. A cap as claimed in claim 12, further comprising laterally spaced ribs integral with the inside of said outer wall portion, said ribs terminating at positions spaced upwardly from the bottom edge of said outer wall portion for abutting the top of the container and for supporting said cap on the container.

19. A cap as claimed in claim 12, wherein said openings comprise oval shaped slots.

20. A cap as claimed in claim 12, wherein said openings are equally laterally spaced from each other around said wall of said conical portion.

* * * * *